US006496575B1

(12) United States Patent
Vasell et al.

(10) Patent No.: US 6,496,575 B1
(45) Date of Patent: Dec. 17, 2002

(54) APPLICATION AND COMMUNICATION PLATFORM FOR CONNECTIVITY BASED SERVICES

(75) Inventors: Jesper Vasell, Göteborg (SE); Tom Idermark, Linköping (SE); Malte Lilliestråle, Stockholm (SE); Hans Thorsen, Lidingö (SE); Staffan Truvé, Alingsås (SE); Carlo Pompili, Stockholm (SE); Johan Ljungberg, Kullavik (SE); Jörgen Andersson, Hägersten (SE)

(73) Assignee: Gatespace AB, Gothenburg (SE)

( * ) Notice: Subject to any disclaimer, the term of this patent is extended or adjusted under 35 U.S.C. 154(b) by 0 days.

(21) Appl. No.: 09/326,550

(22) Filed: Jun. 7, 1999

Related U.S. Application Data

(60) Provisional application No. 60/088,437, filed on Jun. 8, 1998, and provisional application No. 60/123,971, filed on Mar. 12, 1999.

(51) Int. Cl.⁷ ............................................. H04M 11/00
(52) U.S. Cl. ......................... 379/102.05; 379/102.01; 379/106.03; 370/401
(58) Field of Search ........................ 379/106.03, 106.01, 379/102.01, 102.05, 102.07; 370/401, 405

(56) References Cited

U.S. PATENT DOCUMENTS

| 5,896,382 A | * | 4/1999 | Davis et al. ................ 370/401 |
| 6,044,403 A | * | 3/2000 | Gerszberg et al. .......... 709/225 |
| 6,163,602 A | * | 12/2000 | Hammond et al. ..... 379/106.03 |
| 6,167,042 A | * | 12/2000 | Garland et al. ......... 379/106.09 |
| 6,219,409 B1 | * | 4/2001 | Smith et al. ........... 379/106.09 |

FOREIGN PATENT DOCUMENTS

EP 0814393 A 12/1997
WO 98/49663 A 11/1998

OTHER PUBLICATIONS

Desbonnet J et al., "System Architecture and Implementation of a Cebus/Internet Gateway", IEEE Transactions on Consumer Electronics, vol. 43, No. 4, Nov. 1997.

Corcoran P. M. et al., "Browser–Style Interfaces to a Home Automation Network", IEEE, vol. 43, No. 4, Nov. 1997.

Hoffman J, "An Overview of the Consumer Electronic Bus", Proceedings of the International Conference on Consumer Electronics, vol. conf. 9, 1990, pp. 226–227.

Guthery, "Java Card: Internet Computing on a Smart Cart", IEEE Internet Computing, US, IEEE Service Center, Piscataway, NJ, Feb. 1, 1997, pp. 57–59.

Slater A. F., "Extending W3 Clients", Computer Networks and IDSN Systems, NL, North Holland Publishing, Amsterdam, vol. 28, No. 1k/02, Dec. 1, 1995 pp. 61–68.

Pekowsky S., et al., "The Set–Top Box as Multi–Media Terminal", IEEE Transactions on Consumer Electronics, US, IEEE Inc. New York, vol. 44, No. 3, Jun. 1998, pp. 833–840.

* cited by examiner

*Primary Examiner*—Stella Woo
(74) *Attorney, Agent, or Firm*—Burns, Doane, Swecker & Mathis, L.L.P.

(57) ABSTRACT

Open, horizontal service platforms are described. Service providers can, via network operators, load software associated with a service onto a dedicated, service platform server. The service platform server is connected, via a LAN, to one or more remote devices (e.g., sensors, transducers, processors, etc.). The functionality associated with the service can be distributed among two or more of the entities involved in the architecture. The distributed software operates and/or monitors these remote devices to implement the subscribed service.

21 Claims, 6 Drawing Sheets

APPLICATION AND COMMUNICATION PLATFORM FOR CONNECTIVITY BASED SERVICES

RELATED APPLICATIONS

This application is related to, and claims priority from U.S. Provisional Patent Application Serial No. 60/088,437, filed on Jun. 8, 1998 and U.S. Provisional Patent Application Serial No. 60/123,971, filed on Mar. 12, 1999, the disclosures of which are expressly incorporated here by reference.

BACKGROUND

The present invention generally relates to information and communication systems and, more particularly, to systems and methods for providing an open and horizontal platform to distribute and operate connectivity based services.

Recently, many advances have been made in the areas of information and communication technologies. For example, computers, and in particular personal computers, have radically changed the way in which information is manipulated and stored. Moreover, microprocessors are being incorporated into more and more products and are controlling an ever increasing number of processes in the modern world. It is not unusual today to find microprocessors controlling the household appliances we use daily, the automobiles we drive, and even the televisions and VCRs we view for entertainment. At the same time, communication systems continue to expand and develop. For example, in the last decade commercial wireless communication systems have become widely popular for personal communication services. Data communication services have rapidly become more widespread, as well. Notable among the proliferation of new data communication resources is the advent of the Internet.

Practitioners skilled in the information and communication arts frequently view the technologies of information and communication as rapidly becoming one integrated technology rather than two separate areas of research and development. As devices which process and manipulate data become further integrated with devices which communicate data, the potential to use such integrated technologies expands their applicability. For example, Applicants believe that in the near future the number and availability of connectivity based services, i.e., services which monitor or control the operation of remote devices, will rapidly increase.

For example, one form of connectivity based service might entail a utility company remotely monitoring and controlling the operation of a subscriber's devices which consume electricity. Other potential uses for connectivity based services include industrial equipment monitoring and control, building automation, safety and security of both commercial and residential environments, Internet access and electronic commerce, telephony services and mobile communications. However, to date, no integrated solution exists for handling the installation, maintenance, operation control and billing for such connectivity based services.

FIG. 1 depicts existing communication tools arranged by the degree to which each is dedicated to a particular function. FIG. 1 further lists positive and negative attributes of dedicated communication tools and multifunction communication tools. The communication tools of today may be described as belonging to a spectrum ranging from those devices having dedicated functionality and dedicated connections to those devices which are multifunctional and may have many communication connections to different input/output devices.

The sampling of current communication tools shown in FIG. 1 depicts modems and electricity meters at the dedicated end of the functionality spectrum. These devices have certain positive characteristics which include security of information transfer, reliability, ease of maintenance and relatively low cost. However, dedicated communication devices also tend to have the drawbacks that they possess little intelligence or memory and are not very flexible in that they typically have a single dedicated communication channel, provide a limited communication interface for end users and are not easily reconfigurable. Because of these drawbacks, dedicated communication devices are inadequate for use in delivering connectivity based services.

At the other end of the spectrum, today's personal computers provide a wide variety of information and communication services to the end user. These types of devices have the advantages of being relatively flexible with multiple communication interfaces, often have significant memories, and possess the capability to add new applications as they arise. However, in contrast to both personal computers and dedicated communication devices, multifunctional communication tools suffer from poor reliability, are relatively expensive, are difficult to maintain and support and typically require sophisticated user interaction in order to perform their desired functions and/or add new functionality. For these reasons, multifunctional communication devices are poorly suited for delivering connectivity based services.

Accordingly, Applicants recognize a need for a new platform to support the arrival of the anticipated plethora of connectivity based services which Applicants expect to be created in the wake of the evolution of the information and communication technologies. Such a platform should have as many of the positive characteristics of both dedicated and multifunctional conventional communication tools as possible, with as few of the drawbacks as possible.

SUMMARY

These and other drawbacks and limitations of conventional information and communication systems are overcome according to the present invention wherein a platform for connectivity based services is provided in the form of a service gateway system.

Accordingly, it is a purpose of the present invention to provide secure, robust connectivity based service gateway or services platforms. It is a further purpose of the present invention to provide a flexible system for remotely managing the service gateways, while maintaining compatibility with existing information and communication technologies, protocols and interface standards. It is a further purpose of the service gateway system to allow multiple service gateway applications to simultaneously operate without detrimentally affecting each other. It is a further purpose of the service gateway system to be able to cease operations and restart from any level, regardless of whether operations are ceased purposely or inadvertently (e.g., crash). It is a further purpose of the service gateway system that all configurations be persistent, and be either locally or remotely downloadable.

The service gateway system according to the present invention facilitates the development, implementation, operation and maintenance of services in an integrated manner so that the interface between different services providers and the end user is transparent to both. Each service may comprise a set of functionalities and logic which are implemented as software service applications. The service application may be distributed among various pieces of equipment which are geographically separated. Implemented in the software are functions designed to monitor, control and otherwise interact with remote devices in a manner which can be easily monitored by the service provider, the end user, and, potentially, other intermediary operators.

Service gateways according to the present invention are dedicated and scalable so that many different types of services can be implemented efficiently using the same service gateway. Service gateways according to the present invention are preferably open platforms to allow for the development of service applications by third party developers. Moreover, standard communication protocols and programming languages may be used in order to facilitate such software service applications development. In addition to being open platforms, service gateways according to the present invention are intended to be horizontal in nature so that a plurality of service providers can share the same platform infrastructure. While sharing the same infrastructure, the service applications can be modularized so that from the perspective of the service providers, a service gateway according to the present invention will appear as if it is dedicated to each service provider's respective service.

Service gateways according to the present invention are preferably operated, maintained and supported by a business entity rather than end users or subscribers, in order to provide ease of operation, maintenance and support with respect to the end user and promote security and reliability of the services which are deemed to be significant characteristics of service gateways according to the present invention. The business entity which performs the operation, maintenance and support of the service gateways may be different from the entity which actually provides the services being subscribed to by end users. The end user may be an individual, a residence, a business or any other type of entity.

Service gateways according to the present invention are intended to be generic in many ways in order to support different types of services and different types of equipment which provide those services. For example, multiple types of access solutions are envisioned according to the present invention including those involving local area networks and external networks. Various types of terminals may be used to link with service gateways according to the present invention to obtain information about an implemented service or about results associated with such service. Interaction with the implemented service is separated from implementation of the service itself. Given the wide variety of communication devices available today, and a desire to support these various devices as terminals which may access service gateways according to the present invention, various types of output are supported including different types of display sizes.

According to exemplary embodiments of the present invention, service gateway equipment can be connected to a local area network through which the service may be implemented. By providing, as part of the service gateway, such service gateway equipment, services can be personalized and adapted to individual users or entities. Moreover, by localizing some of the functionality of each service proximate the remote devices which are controlled or monitored to actually implement the service (i.e, in the dedicated platform servers), bandwidth associated with each communication link used to implement the service may be efficiently controlled.

BRIEF DESCRIPTION OF THE DRAWINGS

The foregoing objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 1:
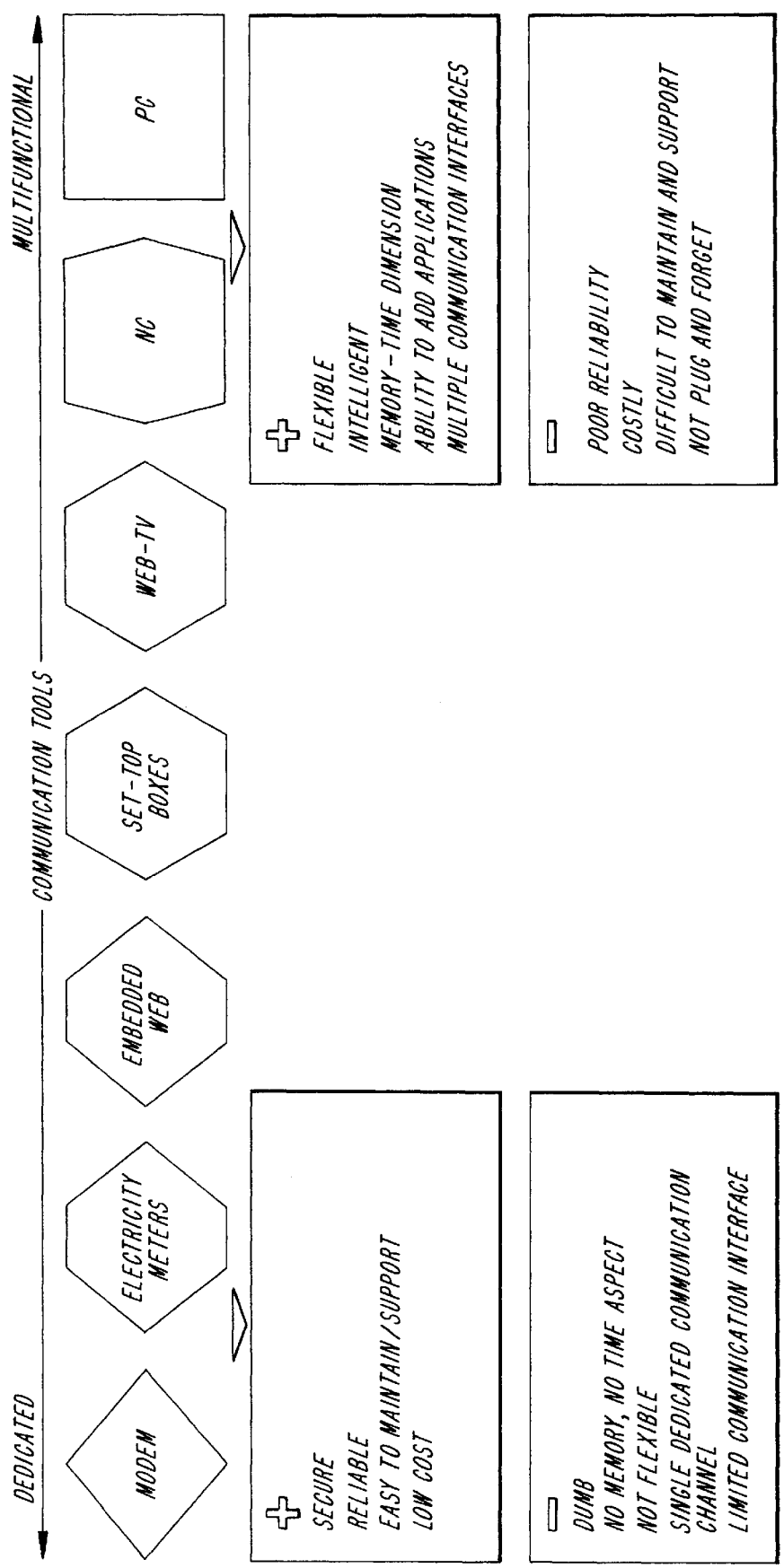
FIG. 1 depicts existing communication tools arranged by the degree to which each is dedicated to a particular function.
Figure 2:
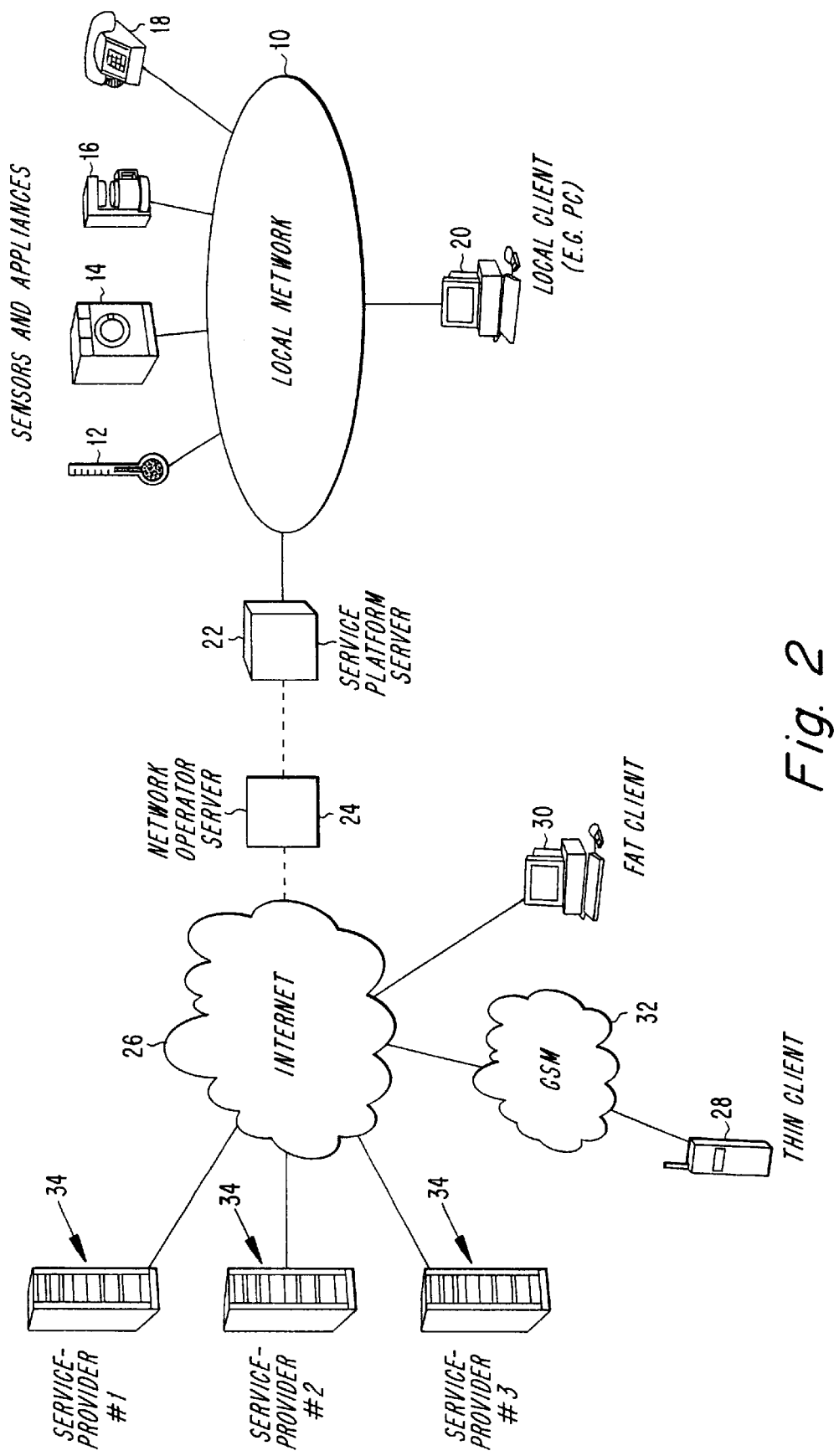
FIG. 2 depicts an exemplary embodiment of the present invention in which a service gateway system provides a platform for connectivity based services.

FIG. 2 depicts an exemplary embodiment of the present invention in which a service gateway system provides a platform for connectivity based services. In this disclosure the terms "gateway" and "platform" are used interchangeably in reference to the present invention. The term "service gateway system" denotes the entire system shown in FIG. 2, from the service providers through a communication network to the end device such as a household appliance. The term "service gateway" refers to a platform serving one end user. Those skilled in the art will, of course, appreciate that the example depicted in FIG. 2 is merely illustrative in many senses and that service gateways according to the present invention are equally applicable to business and other uses. Various configurations of the present invention are possible, each of which is intended to result in a secure, robust, and compatible system of connectivity based service gateways which may be remotely managed. The reasons underlying the need for a secure, robust, compatible, remotely managed system of connectivity based service gateways, as shown in FIG. 2, are outlined in the ensuing paragraphs.

The need for security stems from the fact that the service gateway system is accessed by and shared with multiple service providers and service gateway users. In addition, the nature of the services provided via the service gateway system, which are discussed further in conjunction with FIG. 3, dictates that the system be secure to be of value to the user. On aspect of security is that multiple service applications should be able to simultaneously operate without detrimentally affecting each other. To achieve this, mechanisms for authentication, authorization and access control are integrated within the service gateway system design. The service gateway system should be secure so that it is not susceptible to software viruses to which the system may be inadvertently or purposely exposed.

In addition to being secure, a service gateway should be highly robust. There are two primary reasons underlying the desirability of a robust service gateway system. These two reasons lead to the two forms of robustness that a service gateway should exhibit. First, reliability and cost issues make it desirable for a service gateway to have a relatively long expected lifetime (e.g., potentially 10 or more years). For this reason, service gateway hardware should be robust enough to ensure reliability for such a lifetime. Second, multiple service providers may use the same infrastructure. Because of this, the service gateway should also be robust with respect to software errors and viruses introduced by the service providers. This second aspect of robustness affects the aforementioned security feature in that it prevents operation of a service application from disrupting other service applications, thus, ensuring integrity of the service gateway system.

The need for remote service gateway management arises due to the logistics of managing an extensive network of geographically dispersed service gateways. The service gateway network may potentially range from several hundred thousand to millions of service gateway units. At least some of the many service gateways will be installed in places not easily accessible. It would be logistically difficult to physically access all service gateways in order to, for instance, upgrade software, supervise operations, and detect errors. Therefore, the ability for a service gateway to be managed remotely in as many ways as possible is desirable.

Another desirable characteristic of the service gateway design is that it be compatible to established communications standards, protocols, interface specifications and technologies. In addition to enhancing communication and interfacing among various systems, service gateway compatibility potentially opens third-party markets for service gateway hardware and services. However, specialized portions of the service gateway system may be specifically designed and developed.

The major components of an exemplary service gateway system embodiment for residential use are depicted FIG. 2. As shown, a local area network 10 may be provided in a residence for communicating with and controlling a plurality of sensors, appliances and instruments. Those depicted include a thermostat 12, a clothes washing/drying appliance 14, a coffee maker 16, and a telephone 18. Again, these particular sensors and appliances are depicted merely as examples. A plethora of other types of remote devices will be readily apparent to those skilled in the art. In practice, the sensors, appliances and instruments may take the form of any equipment or device capable of being connected to a computer. Such equipment or devices may include, for example, simple sensors and actuators, appliances, audio and video entertainment and information systems, as well as more complex terminal equipment. One or more local clients 20 may also be attached to the local area network 10 associated with a residence. The local clients 20 may, for example, include a personal computer or a home base station associated with a localized cellular radio-communication system. Service gateways according to the present invention are intended to operate in conjunction with any type of local area network (LAN) including, for example, those based on Ethernet, IR, short distance wireless radio, CEBus, Lonworks, X10 or any other communication protocols.

Another part of the service gateway system connected to the local area network 10 is a service platform server 22. The service platform server 22 is the hardware portion of a service gateway or services platform. The service platform server 22 serves as an edge server which may be installed at the user location. According to exemplary embodiments of the present invention, the service platform server 22 is, preferably, directly connected to the local area network 10, for instance, by Ethernet cable. Alternatively, the service platform server 22 may be connected to the local area network 10 through a modem or other gateway connection. The service platform server 22 interacts with the local area network 10 and remote devices connected thereto, e.g., remote devices 12–18, to implement connectivity based services according to the present invention.

Although it may be physically closer to the local area network 10 than a network operator server 24, the service platform server 22 may be logically considered as a node associated with the network operator rather than the local area network since the service platform server 22 is preferably not open to control or commands from the local area network 10 or, more specifically, from any of the remote devices 12–18 or the local client 20. Instead, control for maintenance, operation and support of the service platform server 22 is preferably performed by the network operator. This ensures ease of operation, maintenance and support with respect to the end user and promotes secure and reliabile performance of the services.

The service platform server 22 may contain all or part of a software application or applications which are used to implement one or more connectivity based services which have been requested and/or subscribed to by the end user, a residential user in this example. The service platform server 22 may include software which communicates with or performs services that interact with one or more of the remote devices 12–18. For instance, such software may facilitate an environmental control service which interacts with the thermostat 12, a laundry service which interacts with the clothes washing/drying appliance 14, a coffee service which interacts with the coffee maker 16 or telephony services which interact with the telephone 18. Telephony services software may interact with the user's landline and/or wireless telephone companies for services such as billing, special calling plans or communication features (e.g., call waiting, voicemail, answering services, etc.), or for services such as Internet protocol telephony. The service platform server 22 may also contain software which, at least in part, implements a service which interacts with the local client(s) 20 of the local area network 10. Further discussion of service gateway software functionality is provided in conjunction with FIG. 6.

According to exemplary embodiments of the present invention, a network operator associated with network operator server 24 is responsible for the operation, maintenance and support of the service platform servers 22 of various end users. Like today's Internet service providers (ISPs) which act as intermediaries between personal computer users and the Internet, network operators using the network operator servers 24 may act as intermediaries between service providers and the end users of those services as illustrated in FIG. 2. Various corporate entities may function as network operators according to the present invention, including, for example, communication utilities such as public telephone companies, communication companies, etc. In the embodiment where network operators act as intermediaries between service providers and end users, the service platform server 22 may be directly connected to the network operator server 24 associated with the network operator. The network operator server 24 equipment may include one or more servers, i.e., relatively powerful computers operating in conjunction with one or more secondary storage devices. The connection between the network operator server 24 and the service platform server 22 may be wire-based or wireless. Alternatively, the service platform server 22 may be connected to the network operator server 24 via the Internet or other communication network.

In any event, the network operator server 24 will be connected to at least one service provider equipment 34 via some communication network, e.g., Internet 26. The service gateway system architecture does not require that a particular type of external network be used, nor does it specify the access technology used. In practice, the external network may be an Internet protocol (IP) network such as the Internet 26, or other network technology (PSTN, ISDN, cable, wireless, etc.). Because the service gateway system is not limited to a particular technology or protocol, it can evolve freely with respect to access technology. The service provider equipment 34, which may include computer systems or servers, may be the initial repository for software used to implement connectivity based services according to the present invention. Exemplary techniques are described below in which these services are implemented upon request.

Users may remotely interact with implemented services. FIG. 2 illustrates two examples of remote user interaction as remote terminals 28 and 30. For example, a service user/subscriber may operate one of the remote terminals 28 and 30 to obtain information associated with the operation of the service or change operating parameters associated with the service, e.g., monitoring results of the thermostat 12 or changing temperature settings. Some remote terminal devices, such as the remote terminal 28 may be connected to the Internet or to the service platform server 22 via intermediary communication networks. For instance, in the case where the remote terminal 28 is a mobile phone used in a cellular network, then the intermediary communication network might be, for example, a Global System for Mobile Communication (GSM) cellular radio communication system 32.

The size and nature of the output devices, e.g., a display associated with various remote terminals 28 and 30, may differ in either the type of output available or the amount of information which can be output at any given time. To accommodate various display capabilities, the service gateway tailors the format of information received from implemented services to the capabilities of the terminal device being used. For example, the remote terminal 28 having a relatively small display may receive information in a first format tailored to that display while the same request generated by the remote terminal 30 having a larger display may result in different information and/or format being presented. Object-oriented programming techniques designed to provide, among other things, these different types of outputs may be found in International Patent Application WO 9623267 to Hans Thorsen, published on Aug. 1, 1996, the disclosure of which is hereby incorporated by reference. Service gateways may also be provided via a wireless application protocol (WAP) server to tailor the capabilities of the user terminal to meet the user's needs. In the case of a mobile remote terminal 28, the short message system protocol (SMS) may be used to adapt the terminal.

According to an exemplary embodiment of the present invention, the user is able to adapt the display layout of the user's own display to best suit his needs. For instance, the user may adjust display controls for, e.g., language settings, size, brightness, display position and orientation, and audible or visible indicators and/or alarms.

Having briefly described an exemplary architecture by which connectivity based services can be supported according to the present invention, an example will now be provided to illustrate how these services can be implemented using distributed processing techniques. Suppose that an end user associated with the local area network 10 contacts service provider #1 which has advertised a service designed to monitor household temperatures and control heating and cooling equipment connected to a local area network to implement a residential user's desired temperature patterns at various times of day, days of the year, etc. This service provider also touts its connectivity based service as being remotely monitorable and adjustable by the residential user using remote terminals. The residential user may enter into an agreement to subscribe to the service with service provider #1 in any conventional manner, such as mail, e-mail, or over the telephone.

Once the residential user has been confirmed as a subscriber, then service provider #1 will inform the network operator server 24 responsible for maintaining and controlling that residential user's service platform server 22. The service can be implemented in various ways depending upon where the software currently resides which is used to implement the service. If, for example, this environmental service offered by service provider #1 is commonly requested by residential users, then the portion of the software used to implement this service which would normally reside on the service platform server 22 may have already been preloaded thereon, in which case the network operator server 24 may simply activate that software by way of a command signal to service platform server 22. Otherwise, the network operator server 24 may download all or part of the software associated with that service to the service platform server 22, whereupon the service platform server 22 can run the newly loaded software to control the thermostat 12 and other remote devices connected to the local area network 10 which are associated with the environmental service for that residential user. In an alternative embodiment, the user may purchase a smart card at a retail outlet or via the mail. The smart card contains the software necessary to implement the desired service. The smart card is inserted either into the service platform service 22 at the user's premises or into the local client 20 which communicates with the service platform service 22. Insertion of the smart card results in implementation of the service, with the service platform service 22 being prompted to contact the network operator 24 for any additional software or settings required to implement the service.

If a service is brand new, or infrequently requested, the network operator server 24 may need to receive some portions of the service application software from the service provider #1 via the Internet 26. Having received the associated software, the network operator can then download some or all of that software to the service platform server 22. As mentioned earlier, Applicants envision that implementation of connectivity based services according to the present invention may take advantage of distributed processing techniques whereby a service may be implemented using software operating on two or more of the servers or processors associated with the architecture illustrated in FIG. 2. For example, a first portion of software associated with the environmental service described above may reside permanently on the #1 service provider equipment 34. A second portion of the software used to implement environment control in the end user's residence may reside as part of the network operator server 24. Likewise, a third portion of the software used to implement this service may reside on the service platform server 22. The distribution of software used to implement any particular service will, of course, depend upon the nature of the service, the nature of the software, and the bandwidth associated with various information transfer needed to implement the desired service. For example, for services which implement a relatively rapid feedback control loop, it may be desirable to provide most or all of the software associated with the feedback control loop directly on the service platform server 22 so that the high data rate/bandwidth communication associated with this portion of the service is confined to communication between the geographically local service platform server 22 and the local network 10, rather than the service provider equipment 34 or the network operator server 24, likely to be more distantly located. Rather than being distributed over all three pieces of equipment, those skilled in the art will appreciate that software may be distributed between the network operator server 24 and the service platform server 22, or between the service provider equipment 34 and the service platform server 22, or any other combination of processors deemed desirable.

Moreover, it is envisioned that in addition to the functionality which is directly associated with the implementation of a particular service, e.g., turning on an air conditioning unit or a heater in connection with an environmental control service, other software modules or service applications may be designed solely to maintain that service. For example, to maintain and control an environmental service, the network operator server 24 may contain other software modules which monitor implementation of the environmental control software on the service platform server 22. This may include, for example, software which records the frequency with which thermostat 12 is operated or adjusted or diagnostic software which monitors the various components, e.g., the service platform server 22 itself, the local area network 10 and the thermostat 12, which are needed to implement the service software stored, at least in part, on the service platform server 22. The capability and responsibility of the network operator server 24 to handle control for operation, maintenance and support of the service implementation is intended to provide enhanced security, reliability and ease of use to the end user of connectivity based services according to the present invention.

As mentioned earlier, service gateways according to the present invention are intended to appear dedicated to each service provider, but in fact reuse infrastructure to support multiple connectivity based services supported by different service providers. Thus, to extend the foregoing example, the residential user having the local area network 10 may also request from service provider #2 certain telephony services which are used to operate, control and monitor the telephone 18. Upon subscription to this service in the same manner described above, the network operator server 24 would once again load, if necessary, the required software portion onto the service platform server 22 for implementing the desired and requested telephony services. The service platform server 22 would then, multitask software service applications which implement the environmental control service and the telephony services for interacting with the remote devices 12–18. Thus, the present invention is seen to be extendible to activate, maintain and control a plurality of connectivity based services on a single service platform server 22 so that this infrastructure can be cost effective.

The service subscriber or user associated with the local area network 10 can interface with the requested services via, for example, the remote terminals 28 or 30 in order to obtain information associated with those services from remote locations. For example, if the user wishes to obtain information about the environmental control service and how it is performing or about his/her telephony services, such information could be accessed remotely and displayed or otherwise output (e.g., voice output) via the remote terminals 28 or 30. Although the user or subscriber has access to this information via remote or local terminals, the user is preferably not able to control the operation of the service platform server 22. This restriction ensures the security and robustness of the service gateway system.

The foregoing exemplary embodiment provides a limited, yet illustrative example of the different types of service providers and connectivity based services which may be implemented using techniques according to the present invention. The present invention encompasses a wide variety of service providers and connectivity based services, further exemplary embodiments of which are illustrated in FIG. 3.

Figure 3:
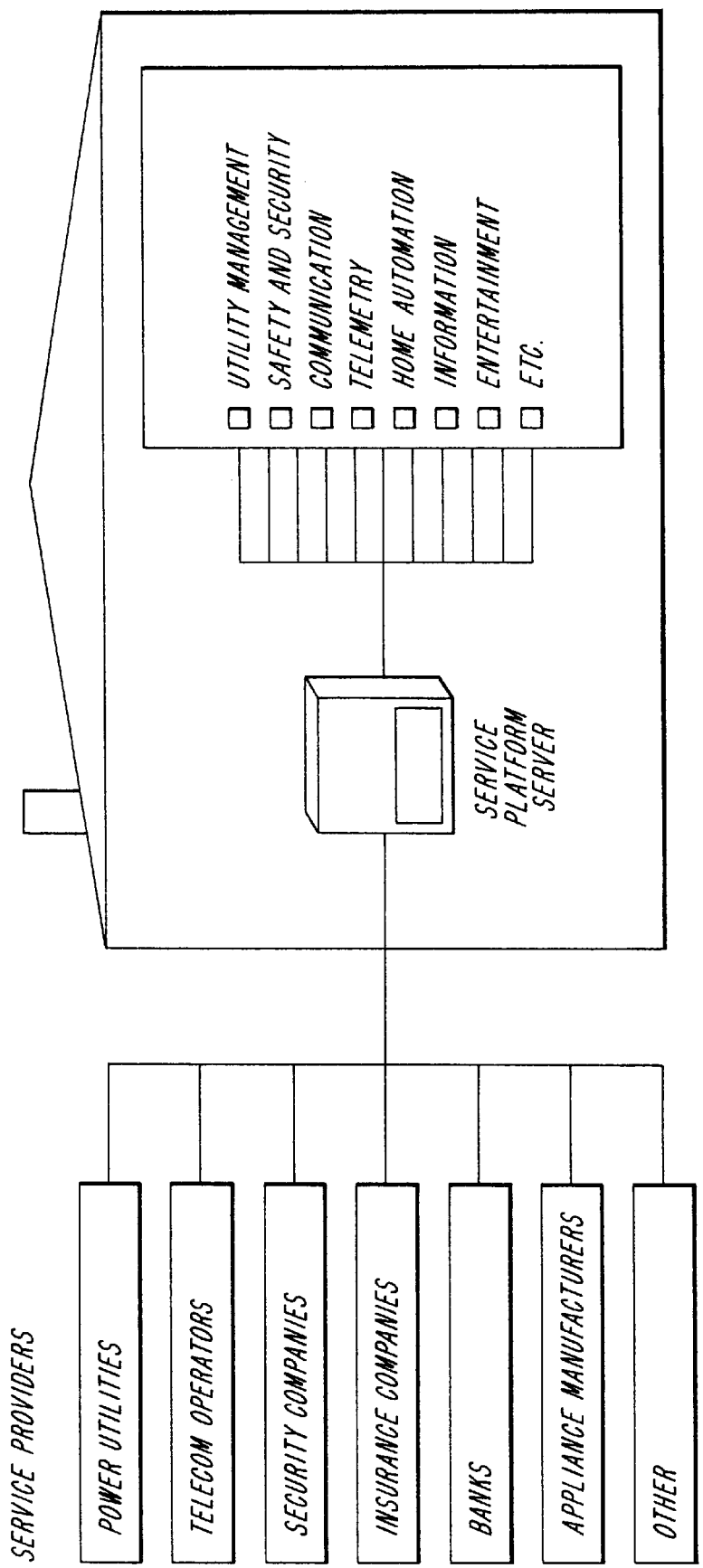
FIG. 3 depicts various potential service providers and connectivity based services.

FIG. 3 depicts various potential service providers and connectivity based services. For example, as conceptually illustrated in FIG. 3, open service gateways according to the present invention may be used to integrate many independent service providers to further exploit efficiencies associated with using this same communication and information processing infrastructure. As seen in the figure, potential service providers include power utilities, telecommunication operators, security companies, insurance companies, banks, appliance manufacturers and others. These or other service providers may make available services which can be added to the service gateway which include, for example, utility management services, safety and security services, communication services, telemetry services, home automation services, information services and entertainment services.

Moreover, the users of service gateways according to the present invention are clearly not limited to household users and residences, but may also include businesses or other entities. For example, a service platform server 22 may provide service support for a businessman or the personnel in an office, an entire office building, an industrial plant, or even a campus-type organizational facility. Additionally, service platform servers 22 according to the present invention are not limited to fixed embodiments, but include mobile embodiments as well.

Figure 4:
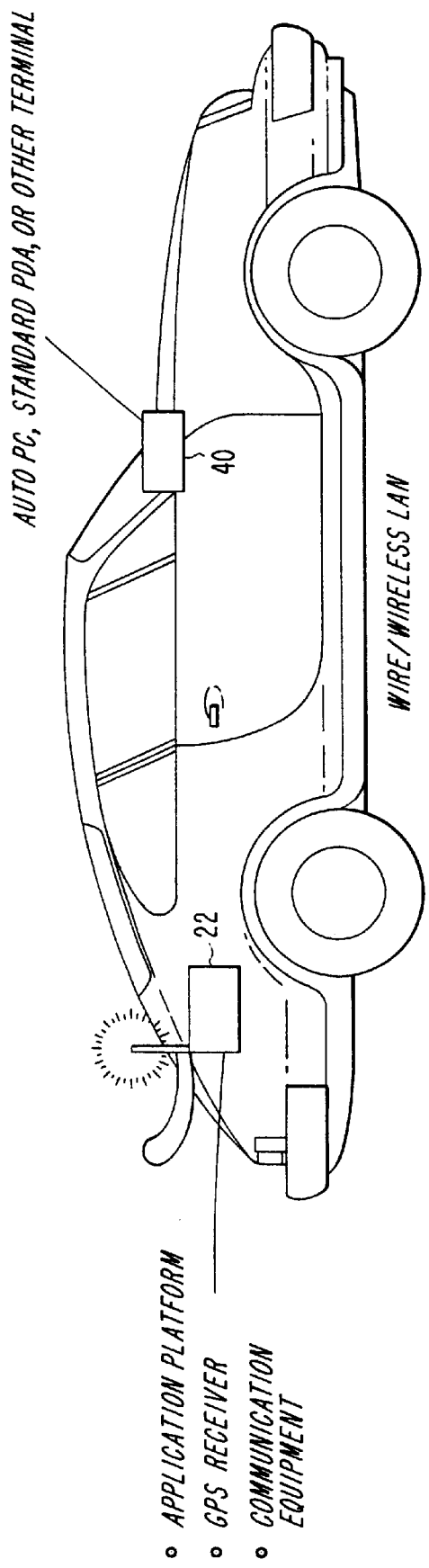
FIG. 4 illustrates an exemplary mobile embodiment of the present invention.

FIG. 4 illustrates an exemplary mobile embodiment of the present invention. Applicants anticipate that connectivity based services will soon be desired by mobile users to an extent similar to the demand for mobile communication services today. According to the exemplary embodiment of FIG. 4, a vehicle is depicted having both a service platform server 22 as well as a local client 40 which may be an automobile PC, standard personal digital assistant (PDA) or any type of terminal device. As an alternative to the automobile shown in FIG. 4, the vehicle could be a boat or ship, with the service platform server 22 being used to provide speed, position, course, weather information, battery level and condition, fuel level and consumption information, or other information pertaining to the boat or ship. The vehicle will also contain a wired or wireless LAN (not shown) by which various remote devices within the vehicle may be monitored and/or controlled. The service platform server 22 may also include wireless communication equipment for communicating with the network operator's equipment. The service platform server 22 may also receive global positioning system (GPS) signals in order to provide the service platform server 22 with information regarding the vehicle's current location. Integration of connectivity based services with mobile environments will enable mobile users to have access to offboard, dynamic information sources as are available via the service gateway system. Moreover, services which have been implemented for that user at his/her residence can follow the user to his/her vehicle providing a seamless integration of connectivity based services. Using the GPS receiver, the services can be adapted to the location of the vehicle. For instance, the vehicle location may serve to trigger the update of information or other remote device functionality. Since the vehicle depicted in FIG. 4 may travel over great distances, it is possible that the service platform server 22 mounted therein may be connected to different operators to support services in connection therewith via a wireless connection.

Figure 5:
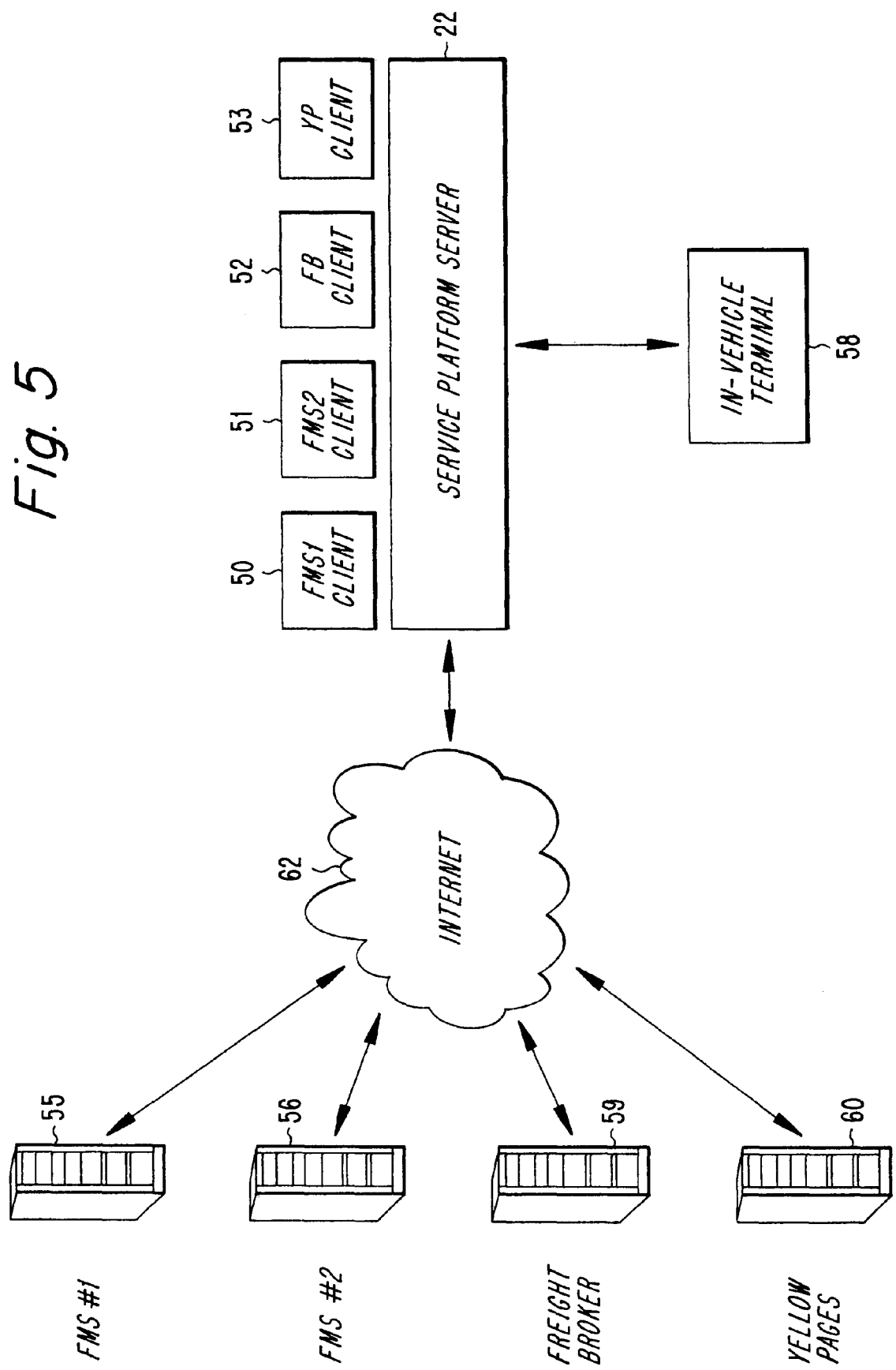
FIG. 5 depicts another mobile embodiment of the present invention.

FIG. 5 depicts an exemplary embodiment of the present invention of a mobile service platform server 22 in connection with the trucking industry. In this embodiment, the truck is outfitted with a service platform server 22 within which various service software client packages have been loaded, denoted by reference numerals 50–53. For example, this particular truck may be employed in the service of two different freight companies, FMS #1 and FMS #2, which coordinate their individual activities using service equipment 55 and 56, respectively. When the truck is employed at any given time by a respective freight management service, the applicable client software package 50 or 51 runs in order to coordinate operations of the truck and communicate information between the appropriate service equipment and the truck. For instance, when the truck is in the employ of the FMS #1, the client software package 50 may be run on the service platform server 22 to provide freight company FMS #1 with information regarding the current location of the truck and its anticipated arrival time of delivery. Similarly, in-vehicle terminal 58 may provide the truck driver with information regarding subsequent deliveries/ pick-ups or other information provided by the client software packages 50–53 which are running at any given time on the service platform server 22. Freight broker and yellow page service providers 59 and 60 are provided as other examples of services which may be implemented on the service platform server 22 for a trucking implementation of service gateways according to the present invention.

According to the exemplary embodiment of FIG. 5, direct connectivity is provided between a communication system (e.g., the Internet 62) and the service platform server 22. Although frequently it will be desirable to interpose an intermediary network operator, there may be certain embodiments of the present invention where the network operator and the associated equipment may be eliminated.

Several examples of specific services envisioned by Applicants have also been mentioned, although those skilled in the art will appreciate that numerous connectivity based services will likely emerge. For example, utility companies are likely candidates for implementing connectivity based services including automated meter reading, real time pricing (wherein the price per kilowatt-hour may vary based on demand), automated load control (wherein a subscriber acquires a server that varies the amount and type of electricity consumption on a household-wide or individual load basis based on, for example, the real time price of electricity, time of day and/or other parameters).

Additionally, Applicants consider secure implementation of these connectivity based services to be important in achieving subscriber satisfaction and acceptance of service gateways according to the present invention. Since various service providers, network providers and, possibly, end users, will share infrastructure, it is important that information and communication associated with each implemented connectivity based service be secure. As mentioned earlier, Applicants envision a preferred embodiment of the present invention to allow only the network operator (and not the subscriber) to have control access to the service platform server 22, which, in part, provides for a more secure platform than if the subscriber was able to control this server. Moreover, Applicants envision widespread usage of other security techniques including data encryption, various authorization and identity verification techniques, etc. to be provided so that the implementation, monitoring and billing associated with these services is robustly defended against intrusion and manipulation.

Figure 6:
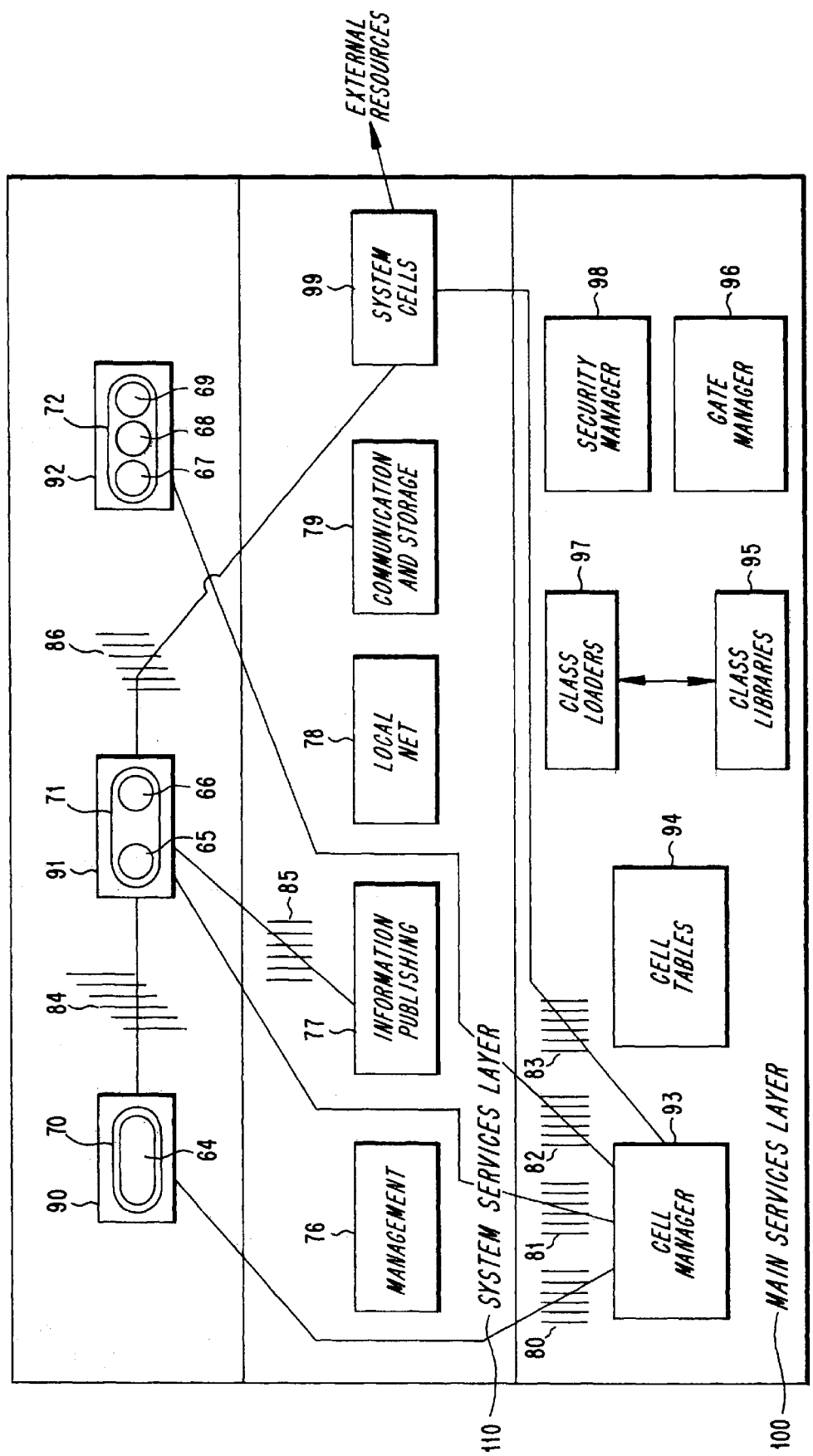
FIG. 6 depicts an exemplary organization of a software system for providing a connectivity based service gateway according to the present invention.

FIG. 6 depicts an exemplary software system for implementing the connectivity based service gateway system according to the present invention. Those skilled in the art will appreciate that this exemplary organizational overview of software is provided merely for illustrative purposes. Various software configurations of the present invention are possible, each of which is intended to result in a secure, robust, and compatible connectivity based service gateway which may be remotely managed. For the sake of clarity of illustration, not all elements or connections between the elements of FIG. 6 are shown. For instance, FIG. 6 depicts three service applications in three cells, and seven gates connecting the various elements of the software system. In practice, the software system of the present invention would likely have many more service applications, cells, gates and other elements than those shown in FIG. 6 for illustrative purposes. In addition, the software elements of the service gateway system may be distributed among various units of geographically separated equipment, as shown in FIG. 2.

Service Applications

Service applications 70–72 of FIG. 6 implement the connectivity based services which a user may request or subscribe. As part of implementing a connectivity based service, the service applications 70–72 interact with the devices pertaining to the service being provided, e.g., the remote devices 12–18 of FIG. 2. Such interaction with the remote devices 12–18 may involve operating, controlling, adjusting, monitoring, reading, recording, activating, deactivating, analyzing, playing, or any other type of function involving the remote devices 12–18. The types of connectivity based services provided by service providers 34 of FIG. 2 may include, for instance, services pertaining to utility management services, safety and security services, communication services, telemetry services, home automation services, information services, entertainment services, or the like.

Because of the need for a secure, robust environment for the service applications 70–72, integrity among the service applications 70–72 and between all applications and communications networks involving the service gateway system is desirable. To achieve a secure, robust environment, different ones of the service applications 70–72 are not allowed to inadvertently interact in such a way that would cause them to fail or detrimentally affect each other. For example, one of the service applications 70–72 such as, e.g., a video telephone service application, may require a great deal of bandwidth for operation. Such a service application would not be allowed to entirely dominate the resources of a service gateway to the extent that other service applications are "starved" of the resources they need to run. Instead, resource requirements may by dynamically allocated based upon a predetermined scheme of maximum allowed or minimum required resources, for a given situation.

The restriction against inadvertently interact between the service applications 70–72 does not suggest that the service applications 70–72 are strictly prohibited from any interaction at all. One of the service applications 70–72 may at least indirectly provide a service to another of the service applications 70–72, under a given set of circumstances. For example, it may be the case that the service application 70 controls the audio system of a business office, and the service application 71, having as one of its sensors a noise detection unit, controls the security system of the same business office. In this example, it is desirable for the two service applications 70 and 71 to communicate with each other in order to avoid false alarms due to the audio system under the control of service application 70 being detected by the noise detection unit under the control of alarm system service application 71. An alternative embodiment allows for resource tradeoffs between the service applications 70–72, so as to maximize user benefit for a given amount of resources. For example, it may be the case that two of the service applications 70–71, e.g., a video telephone service application and a 3-D interactive video game, are very resource intensive and cannot be used at the same time. In such a situation, when one of the resource intensive service applications 70–71 is being used and someone seeks to start another (e.g. make a video telephone call while the 3-D game is running), a user prompt may be provided according to a predetermined scheme. The user prompt may, for instance, give the option of using the video telephone at lower picture quality, or inform the user that making the video telephone call will result in lower quality rendering of the 3-game background images.

The service applications 70–72 include the boxlets 64–69 within the cells 90–92. The boxlets 64–69 consist of code (which may be the software code, programs, subroutines, arguments, or programming logic) which implements the service associated with one of the service applications 70–72. Cells 90–92 represent the resources made available to the service applications 70–72. Evoking one of the service applications 70–72 causes the boxlet within the applicable cell 90–92 to be performed.

The development of the boxlets 64–69 is not restricted to any particular software language or operating system. According to this exemplary embodiment, the only code specific to development of the boxlets 64–69 is in class libraries 95 which contain the service application 70–72 program interfaces for the main services layer 100 and the system services layer 110. The boxlets 64–69 may be designated into various categories having different degrees of access restriction for use within the service applications 70–72. Classes, which are boxlets categorized for some extent of access restriction, are maintained in class libraries 95, which are described in more detail below.

Cells

The cells 90–92 represent the resources made available to the service applications 70–72. Operations of the cells 90–92 are described in more detail, below. Conventional software systems do not use cells such as the cells 90–92 according to the present invention, but instead, use processes or some similar software entity to make resources available to a particular application 70–72. The cells 90–92 according to the present invention differ from processes in several fundamental respects. For instance, the cells 90–92 are not allowed to start or stop each other. Therefore, no parent/child relationship exists between the cells 90–92. Also, the number and identities of the cells 90–92 running in a service gateway system are configured through use of a cell table 94. Because of this, the cells 90–92 tend to be more controllable and more static than processes. Unlike processes, the cells 90–92 may be implemented using class loaders 97 in order to provide the encapsulation, protection, and access restriction desired for the service applications 70–72. In addition, unlike processes the cells 90–92 according to the present invention communicate using the gates 80–86. The design features of the present invention such as the cells 90–92, the gates 80–86, and the other elements of FIG. 6, foreshortens the need for processes within the service applications 70–72, and allows the functions, responsibilities and access of the cells 90–92 to be limited, monitored and controlled.

According to exemplary embodiments of the present invention, the cells 90–92 are characterized by certain features and attributes. Each of the cells 90–92 has a name which is unique among the cells 90–92. The cells 90–92 may be designated as either permanent or transient. The cells 90–92 designated as permanent are started and then kept, while the cells 90–92 designated as transient are only started on demand. Each of the cells 90–92 may be characterized according to its quota of resources (e.g., CPU, memory, persistent storage, and the like). The cells 90–92 are further characterized by their association with the main libraries 95, including specified classes to which the cell has access. The cells 90–92 may also be characterized by the types of arguments that the cells 90–92 are permitted to send and receive via the gates 80–86. In addition, one or more cells may be characterized as being privileged "system" cells 99, depending on the cell's access to external resources.

In general, each of the cells 90–92 may be thought of as the resources made available to one of the service applications 70–72. In certain situations, a particular one of the service applications 70–72 may be divided among more than one of the cells 90–92. This may occur in the situation where a particular one of the service applications 70–72 naturally decomposes into layers of functionality, with the upper layers needing fewer rights than the lower layers. Structuring the different layers of a service application 70–72 into different ones of the cells 90–92 reduces the potential for damage by faulty layers or unauthorized access within one cell 90–92. For example, a family may subscribe to a financial service application 70–72 which provides checking accounts for the family members and further provides a stocks trading account. This financial service application 70–72 could be arranged in two of the cells 90–92 to enable the parents of carry special stock quote pagers, and to restrict the family's teenagers from accessing the stock trading account.

Class Libraries

To ensure the security and robustness of the service gateway system, there is a distinction between the cells 90–92 which contain the boxlets 64–69, and the class libraries 95 (or "libs") which also contain the boxlets 64–69. The distinction is that the cells 90–92 may not access the boxlets 64–69 directly from other cells 90–92, but the cells 90–92 may gain access to certain categories of classes (restricted categories of the boxlets 64–69) in the libraries 95. Also, the libraries 95 may access certain categories of classes in other libraries 95. In the situation where two or more of the cells 90–92 are accessing a particular class from a library 95, that class may be thought of as being shared by the cells 90–92, even though the cells 90–92 do not directly access the class from other cells 90–92. One reason for using the class libraries 95 to provide class access to the cells 90–92 is to prevent corruption of the cells 90–92 due to static fields in shared code. If the cells 90–92 were to share classes having static fields, they would, in effect, be accessing the same portions of memory. Such sharing of memory, if uncontrolled, could possibly result in data corruption or unauthorized access, in certain situations. On the other hand, a class that has no static fields may be safely shared between two of the cells 90–92 since there is no way for such objects to leak information between each other. If one of the cells 90–92 has a class containing a static field, any other of the cells 90–92 should use distinct copies of the class rather than having direct access to the class containing the static field.

In practice, the effective and efficient use of class libraries 95 for controlling access to the various classes makes this aspect of the present invention a desirable means of sharing the boxlets 64–69. One feature of each single class library 95 within the class libraries 95 is that each has a name which is unique among all the libraries 95. In sum, the class libraries 95 are essentially code archives containing, for instance, subdirectories of zip files, jar files, class directories, software code, programs, subroutines, programming logic or the like.

Various ones of the libraries 95 may contain classes categorized as being either shared, private, or single. A shared class of a library 95 may be shared by different ones of the cells 90–92 or other libraries. For private classes, however, a separate copy of each private class should be stored in a library 95, with that separate copy of the private class being accessed by only one of the cells 90–92. In other words, there is no sharing of private classes among the cells 90–92 or other libraries. There may be private classes for which there should only be one copy, period. In other words, rather than providing each of the cells 90–92 with its own private copy of this class, there is only one single copy of the class to which access is limited to one of the cells 90–92. This latter category of class is known as the single class.

Since the libraries 95 may use classes from other libraries 95, the inter-library access of classes is registered and tracked in a dependent library list of the libraries 95 from which classes are borrowed. The dependent library list is preferably the property of the library 95 from which the class was borrowed or accessed. In any case, references between the libraries 95 should not be circular. To maintain a robust, secure environment for the service gateway system, the libraries 95 containing shared classes may only reference other libraries 95 containing shared classes, and may not reference libraries 95 which have private classes or single classes.

As will be apparent from the foregoing discussion, a particular one of the cells 90–92 may only access its own classes or shared classes. Access to classes by the cells 90–92 is controlled and enforced by class loaders 97 operating in combination with a security manager 98 and the class libraries 95. The security manager 98 may be part of the cell manager 93. The class loaders 97 which load classes to and from the libraries 95, define the area into which a class is grouped. In this way access to a class may be managed. Thus, a class is a set of code to which the extent of access by cells 90–92 is defined. Each of the cells 90–92 may retrieve only the classes to which is has been granted access, for instance, the service gateway system-wide shared classes, classes pertaining to the particular language or code type used to implement the service gateway system, and the cell's own classes.

Cell Operations

Starting one of the cells 90–92 involves the creation of an instance of the boxlet's main class with the routines of the initialize ("init") method and the start method for that cell 90–92. Similarly, each of the cells 90–92 may be terminated by calling the boxlet's stop method and destroy method for that cell 90–92, thus closing all connections to and from the boxlet and stopping what is known as the threads of the cell 90–92. The initialize method, start method, stop method, and destroy method are stored in the class libraries 95. One of the cells 90–92 may be started, or restarted, as a result of a gate request for that cell to the cell manager 93. After receiving a gate request for one of the cells 90–92 and determining that the requested cell 90–92 is not currently running, the cell manager 93 begins the process of starting the requested cell. One of the cells 90–92 which is a permanent cell may also be started if it is discovered not to be running as a result of rereading the cell tables 94, or if the cell manager 93 determines that a permanent cell has crashed.

The startup of a new one of the cells 90–92 involves opening the class libraries 95 and having the class loaders 97 load and install the appropriate main class in order to create a main gate 80–83. In addition, the cell manager 93 initializes routines called initialize method and start method, as part of the startup process for the new one of cells 90–92 to be created. The cell startup will be successful only if the initialize method returns an appropriate response value before timing-out within a predetermined time limit. If the initialize method returns a negative response or exception, or if the initialize method times-out, the cell manager 93 may terminate the new cell 90–92 being created. In the case where a new cell is terminated, the initialize method is stopped and the destroy method is called. If the call to initialize method was successful, the cell manager 93 initiates a routine called start method. During the start method the newly created cell 90–92 may terminate the creation process or may simply pause (hang) without completing the start method. If the start method returns a negative response or an exception, the cell manager 93 terminates the new cell 90–92 being created. When such a termination occurs, the cell manager 93 initiates the routines of both stop method and destroy method.

During the creation of a new cell 90–92, the initialize method may, where authorization is proper, open the gates 80–86 to existing cells 90–92 by using, e.g., the buildgate method. On the other hand, a new cell 90–92 being created is protected from having other ones of the cells 90–92 open gates to the newly created cell during its initialization. Upon finishing the initialize method to complete the initialization phase, and after the start method has been called, new gates may be created from the existing cells 90–92 to the newly created cell 90–92.

The newly created cell 90–92 is responsible for coordinating its start method and creation of any gates 80–86 to it. This avoids problems from arising associated with having more than one of the cells 90–92 simultaneously call the newly created cell 90–92. The situation in which the initialize method opens one of the gates 80–86 to another cell which in turn directly or indirectly attempts to open another of the gates 80–86 back to the cell may potentially cause a deadlock situation. The cell manager 93 monitors the execution of the various methods during cell creation to avoid such a deadlock situation. When an impending deadlock is detected, the cell manager 93 causes the offending gate request (e.g., opengate, buildgate ) to fail.

If one of the cells 90–92 crashes too many times within a given predetermined time period, the cell manager 93 may disable it. The cell 90–92 remains disabled until it is either replaced as a result of loading a new cell table 94 or reenabled by the cell manager 93 or by the system management application program interface (API).

One of the cells 90–92 may be stopped by the cell manager 93 for any of several reasons. For instance, a cell 90–92 may be stopped by the cell manager 93 if the cell's initialize method pauses for too long or returns a negative response or an exception. A cell 90–92 may also be stopped if its start method pauses for too long or returns a negative response or an exception. A cell 90–92 may be stopped if its service application 70–72 no longer exists, which may arise as the result of a reread of the cell table 94, for instance. A cell 90–92 may be stopped if its service application 70–72 needs to be restarted because the settings have changed for the libraries 95 pertaining to the cell 90–92 and the service application 70–72. Changes in the settings of the libraries 95 or other changes in the state of a cell 90–92 come to light as a result of a reread of the cell table 94, for instance. A cell 90–92 may also be stopped if the service gateway system, the applicable service platform server 22, or other element of the service gateway system is halted, crashes or otherwise malfunctions.

One of the cells 90–92 may be terminated by calling the stop method, closing all the imported and exported gates 80–86, calling the destroy method, causing termination of all executing threads of the cell 90–92, and releasing any classes loaded from the libraries 95. Typically, the stop method is called first and should return a response within a predetermined time limit. If a time-out occurs because the stop method has not responded, the cell manager 93 may terminate the stop method. While the stop method is being performed, it may open new gates 80–86 to the other cells 90–92, but is protected from having to grant requests for new gates to the cell 90–92 being stopped. Upon completion of the stop method, all gates 80–86 will have been closed to and from to the cell 90–92 being stopped.

Typically, after a cell 90–92 is stopped, the destroy method may be called to destroy the cell 90–92 no longer desired. The destroy method should also respond within a predetermined time limit. If a time-out occurs because the destroy method has not responded, the cell manager 93 may terminate the stop method. As a final measure in destroying one of the cells 90–92, all threads, connections, gateways and other avenues of communication are destroyed, preventing them from communicating to or from the cell. Upon termination, the cell 90–92 which was terminated ceases to exist and can no longer be reached by any other of the cells 90–92. The terminated cell is then garbage collectable.

To perform useful functions, the cells 90–92 must be able to communicate among one another. Also, some of the cells 90–92 may need limited access to external resources such as devices, files, sockets, programs or the like. Inter-cell communication for the cells 90–92 is achieved through the use of gates such as the gates 80–86 of FIG. 6. In a preferred embodiment for accessing external resources, responsibility and authority for accessing external resources is vested in a set of trusted "system" cells, such as system cell 99 of FIG. 6. This means of accessing external resources may be implemented by supporting privileged system cells 99 characterized by full access to the system area services layer 110. Also, the authority of the security manager 98 over the system cells 99 would be disabled. For illustrative purposes because of the significant differences between the system cell 99 and the cells 90–92, the system cell 99 is reflected as being a part of the system services layer 110.

Alternative embodiments for accessing external resources involve requests for accessing external resources are made by the cells 90–92 to directly the cell manager 93 or to security manager 98. Such methods of managing the access to external resources have the drawback of unnecessarily placing too much functionality in the cell manager 93 or the security manager 98, thus, slowing down operation of the service gateway system and increasing the possibility of operational failures. It is better to reserve the resources of the cell manager 93 to handling existing functions and communication matters.

Gates

The gates 80–86 provide and control inter-cell communication. Without gates 80–86, the cells 90–92, in their basic form, are isolated from each other and from the outside world. Absent some mode of inter-cell access, even the system cells 99 cannot communicate with other cells. What is lacking in the cells 90–92 is a form of inter-cell communication. The gates 80–86 provide and control inter-cell communication. In doing so, the gates 80–86 support methods for cell termination and facilitate the addition of resource management, without compromising integrity of the cells 90–92. In fact, the gates 80–86 are the mechanisms used to achieve application integrity. The cells 90–92 do not obtain direct references objects in other cells 90–92, but instead communicate to the other cells 90–92 via the gates 80–86. Thus, the gates 80–86 serve as controlled interfaces as the service applications 70–72 within the cells 90–92 interact with each other, with the main services layer 100, or with system services layer 110. The interface parameters and control aspects of the gates 80–86 are defined at the time of creation for each of the gates 80–86, but may later be modified by the gate manager 96 of the main layer 100.

The gates 80–86, which each represent an inter-cell connection, are characterized by the following features. The gates 80–86 are each specific to one pair of the cells 90–92 and cannot be handed over to another cell or a third party. Each of the gates 80–86 works locally within a single local operating environment such as a Java Virtual Machine (JVM), or the like. In an alternative embodiment, remote gates may be provided which reside in multiple JVMs. No particular local operating environment is required for development of the gates 80–86; different particular ones of the gates 80–86 could be implemented in different local operating environments. The gates 80–86 may be closed by the cells 90–92 at either side of the gate 80–86. Each of the gates 80–86 is automatically closed if either of the cells 90–92 associated with the gate or either side of the gate is terminated. One of the cells 90–92 may request notification when a gate 80–86 associated with it closes.

The logic, processes and/or mechanisms for creating the gates 80–86 are transparent; there is no requirement for a separate stub compiler dedicated to creating the gates 80–86. A stub compiler generates the source code, or boxlets, of classes based on the specifications and parameters for of the class. To create a gate to one of the cells 90–92, the stub compiler uses the specifications and parameters of the cell 90–92 to which the gate is being created. In effect, the stub compiler produces source code or the boxlets 64–69 for a class which implements the same interface specifications and parameters as the requested cell 90–92. Thus, the creation of one of the gates 80–86 may be thought of as exporting an interface. As a practical matter, the gates 80–86 may be initiated by a routine or method in addition to use of interface glue consisting of classes or the boxlets 64–69 produced by the stub compiler.

One of the gates 80–86 may be created upon request from the service applications 70–72 and issued by the gate manager 96 after checking that the requesting service application 70–72 is authorized to receive the gate 80–86 of the specified type. An exemplary process for creating a gate may proceed as follows, for creation of the gate 84 between the cells 90 and 91. For example, the cell 90 may request a connection to the cell 91 by calling a program or method of the main gate 80 for opening a gate (e.g., the routine called the "opengate" method). In response to this gate request, the main gate 80 verifies whether the cell 91, the server cell, exists and access to the cell 91 is permitted. The main gate 80 starts the server where the cell 91 resides, e.g., service platform server 22, if it is not already running. The main gate 80 calls a program of the server for creating the gate, e.g., the "boxlet.buildgate( )" method.

If the gate 84 being created is of a new gate type, the main gate 80 may invoke a stub compiler to produce a proxy class for the gate object returned by "buildgate." Such a proxy class need only be initiated once only for each new gate type. The main gate 80 records the newly created gate 84 and any proxy (if necessary) in import/export tables within the main services layer 100. Import/export tables may be located in the memory containing the cell table 94 and/or the class libraries 95. Recording the newly created gate 84 in this manner allows the gate 84 to be closed when either of the cells 90 or 91 terminate. The proxy is then returned to the client cell 90.

In general, every object, except for certain shared classes, belongs to one of the cells 90–92. Consequently, all arguments and return values resulting from a communication via the gates 80–86 should either be copied or else represented by a proxy on the other side of the gate 80–86. The gates 80–86 may use proxies structured much like a gate in order to send certain types of objects which may not be serialized. The use of proxies enables gates 80–86 to operate at relatively high speeds allowing them to perform simple copying of certain types of objects rather than serializing all objects.

Without the use of such proxies, it would be impossible to send a listener across one of the gates 80–86. Listeners are entities, or classes, that have been registered to receive event notifications from other classes upon the occurrence or pending occurrence of a specified event. Whenever an event of the specified type occurs, a predetermined operation is invoked within the listener. For example, the occurrence of an alarm indication within the fire alarm service application of a household, could invoke a listener within an audio system control service application to shut down the household's audio system so the fire alarm could be heard. Aside from listeners, another use of proxies for sending non-serialized objects, is for the sending of input/output (I/O) streams.

Access rules may be used to control access or communication permissions between the cells 90–92. Specific access rules override more general access rules, in case of any conflict or inconsistency between access rules. As an example of access rules being used to control access, consider the previous example of the gate 84 being built between the cell 90 and the cell 91 of FIG. 6. For instance, if the cell 90 tries to open a gate to the cell 91 (assuming the gate 84 is not open), the rules are searched for determine whether access is allowed. If no match is found, the request, e.g., the opengate method, is denied. If the rules allow access, the cell manager 93 attempts to contact the cell 91 by calling a program or method within the cell 91 which controls gate access. The extent of access allowed and the access mode permitted in the rules is an indication to the cell 91 of the level of service to grant to the cell 90. The interpretation of the rules pertaining to access and the extent of access to be granted is preferably is up to the cell 91 which is granting the access, but may be accorded to the cell manager 93, in an alternative embodiment, either for deciding or for verifying the decision of the cell 91.

As a means of keeping track of the access rules assigned to various ones of the cells 90–92, groups may be formed for the cells 90–92 having the same access rules. Such groups form a convenient shorthand for the number and type of access rules pertaining to particular cells 90–92. Groups typically consist of a list of the cells 90–92 and/or other groups, all of which have the same set of access rules.

The service applications 70–72 are not required to export any gate interfaces (i.e., be connected by any gates), with the exception that each of the service applications 70–72 must always have at least one of the main gates 80–82 associated with it. One purpose of each of the main gates 80–82 is to provide the interfaces needed for communication with the cells 90–92 and the gate manager 96.

Cell Manager

The cell manager 93 provides one of the main gates 80–82 to each one of the cells 90–92 at the time it is created. In practice, each of the main gates 80–82 may be handed to the newly created one of the cells 90–92 as an argument in the form of "boxlet.init* ( )." The cell manager 93 performs several functions pertaining to the cells 90–92. The cell manager 93 performs its functions via the main gates 80–82. For instance, the cell manager 93 uses the main gates 80–82 to request a name for each of the cells 90–92 and also to terminate the cells 90–92. The cell manager 93 uses main gates 80–82 to open and close other gates such as the gates 83–86. The cell manager 93 also uses main gates 80–82 to add and remove gate listeners. The system services layer 110 of FIG. 6 provides general services 76–79 which the service applications 70–72 may use. The general services 76–79 of the system services layer 110 are implemented in the same manner as the service applications 70–72. In other words, they are implemented in the form of the boxlets 64–69 executing within cells. Likewise, interfaces offered by the general services 76–79 of the system service layer 110 are exported in the form of gates such as the gates 80–86.

The cell manager 93 is responsible for starting or activating cells 90–92 as well as and stopping and destroying cells 90–92. A new one of cells 90–92 will not be activated unless it is complete. This ensures that the cells 90–92 of the service gateway system are at all times complete. The cell manager 93 manages operation of the cells 90–92 so that the right set of the cells 90–92 are running to provide tasks pertaining to the service applications 70–72 that are required at a given time. In performing these functions, the cell manager 93 considers information stored in the cell table 94 which specifies the cells 90–92 that should be running on the service gateway system. The cell manager 93 handles access control by determining the gates 80–86 to be created between the cells 70–72. Furthermore, the cell manager 93 handles resource management so that no single one of the cells 90–92 consumes too much of the service gateway system or service platform server 22 resources, e.g., CPU time, memory, persistent storage, and the like. These and other design aspects of the service gateway system ensure the security, isolation and robustness of the service applications 70–72, facilitate management of service applications 70–72 lifetimes, and allow resource management for cells 90–92.

Upon booting the service platform server 22 shown in FIG. 2, the cell manager 93 reads the cell table 94 into memory and starts up the specified service applications 70–72. The cells 90–92 may be designated as either permanent or transient. The cells 90–92 designated as permanent are started and then kept running. If one of the permanent cells 90–92 crashes, it is restarted. The cells 90–92 designated as transient are only started on demand. For instance, when another cell attempts to contact one of the transient cells 90–92, the transient cell is started.

When the service gateway software configuration is changed as a result of updating the cell table 94 or upon booting the service platform server 22, a number of actions take place which may potentially cause timing problems. The various code classes, methods, programs, subroutines, or the like, of the service applications 70–72 may have to be started in a certain order to avoid software glitches or operational malfunctioning. In general, it is exceedingly difficult, if not impossible, to automatically and accurately determine the correct boot sequence, since a service application 70–72 may dynamically request a gate 80–86 to another service application 70–72 in an unpredictable way. The use of the cell table 94 according to the present invention, avoids such problems.

Cell Table

The cell table 94 serves as a dedicated place for storing the state of the service applications 70–72. By having the necessary state information stored in the cell table 94, the cell manager 93 is free to boot the service applications 70–72 of the cells 90–92 in any order. Upon booting a particular service application 70–72, its cell 90–92 may request a one of the gates 80–86. If one of the cells 90–92 requests a gate 80–86 to another of the cells 90–92 that has not yet started, the gate request is paused while the requested cell 90–92 starts up. The procedure works equally well for permanent cells and transient cells. Because of the robustness and reliability afforded during bootup, it is preferred to use the cell table 94 and the cell manager 93 for keeping track of the state of the service applications 70–72. Hence, it is preferable that the service applications 70–72 be prohibited from registering themselves during startup.

Use of the cell table 94 allows the cell manager 93 to be able to cease operations and restart from any level, both in situations where operations are purposely stopped and when operations crash, which is one of the purposes of the service gateway system. When the service platform server 22 boots, the cell manager 93 attempts to start the cell 90–92 associated with the service platform server 22 at the last complete configurations of service applications 70–72 listed in the cell table 94. If this is unsuccessful because of error or configuration failure or some other reason, the cell manager 93 attempts to boot the service platform server 22 using various alternatives from a fallback list.

Adding a new one of the service applications 70–72 may involve changes in one or more of the cells 90–92. For instance, a temperature control system service application may be added which uses existing sensors and also some new sensors. The installation of a temperature control system service application with new sensors may require that some classes of code from class libraries 95 be downloaded. As a result of the changed state of the temperature control system service application, a new cell table 94 should be generated listing the new state of the affected cells 90–92. The new cell table 94 should also be activated. Once this has taken place, the cell manager 93 will be able to dynamically sort out the necessary steps to activate the new temperature control system service application, regardless of its previous condition or state.

The cell table 94 may be thought of as containing the system configuration which drives the actions of cell manager 93. As part of routine maintenance or in response to an error event, the cell manager 93 may be periodically prompted to reread the cell table 94. When this occurs, the cell manager 93 stops old inactive cells 90–92 that are no longer listed in the cell table 94 and starts any newcomers which are listed in the cell table 94 but are not active or running. The reread request may be part of the system management application program interface (API), making it normally unavailable to the cells 90–92. A request to the cell manager 93 to reread the cell table 94 may result in a number of activities taking place, including, setting the system log stream, setting the load path for class libraries 95, setting the active cell table 94 list, prompting a cell table 94 reread, starting or restarting the service gateway system, and/or halting the service gateway system.

In addition to managing the creation and destruction of the cells 90–92, the cell manager 93 and the cell table 94 are also involved in inter-cell communication and security. The information stored in the cell table 94 pertaining to the access granted to the cells 90–92 is integral to inter-cell communication and security. An exemplary format of the cell table 94 may contain four or more types of entries pertaining to the identity of cells 90–92. For instance, such an exemplary format of the cell table 94 contains a description of the cells 90–92, information about the classes in libraries 95 associated with each of the cells 90–92, the various degrees of access afforded each of the cells 90–92, and the association of any cell groups to the cells 90–92.

The information stored in the cell table 94 allows the service platform server 22 to be switched on the fly to a new configuration of a service application 70–72. For instance, the cell manager 93 may be notified of a new configuration of one of the service applications 70–72 by a service provider 34 of FIG. 2. The cell manager 93 will then update to the new configuration by stopping the existing configuration of the service application 70–72, if it is running, and starting the new configuration. In this way, service may continue undisturbed while configuration updates take place. This ensures smooth updates together with complete crash protection.

System Services

The system services 76–79 of the system services layer 110 includes a management system service 76, an information publishing system service 77, a local net system service 78, and a communication and storage system service 79. The management system service 76 provides an external interface through which the service applications 70–72 may be downloaded, installed, removed, executed, and controlled. The information publishing system service 77 contains a server such as, for instance, an HTTP server, through which the service applications 70–72 can publish or transmit information for display. This allows the service applications 70–72 to make information available to client terminals 20, 28 or 30 in both the local network 10 and external networks such as the Internet 26 of FIG. 2. The local network services 78 provide the proper interfaces and drivers which allow the service applications 70–72 to communicate with the devices 12–18 on the local network 10 as well as external networks such as the Internet 26 or GSM 32 of FIG. 2. The communication and storage system service 79 provides persistent storage that the service applications 70–72 may use for communicating among themselves and with entities in the external networks.

While the present invention has been described using the foregoing exemplary embodiments, these embodiments are intended to be illustrative in all respects, rather than restrictive of the present invention. Thus, the scope of the present invention is instead set forth by the appended claims and encompasses any and all equivalents and modifications embraced thereby.

What is claimed is:

1. A system for distributing and controlling connectivity based services, the system comprising:
　　at least one remote device capable of being monitored by a connectivity based service;
　　a client device for allowing a subscriber of a connectivity based service to interact therewith;

a service gateway unit connected to said at least one remote device via a local area network;

network operator equipment connected to at least one service gateway unit; and service provider equipment connected to said network operator equipment via a communication link, wherein said network operator equipment is configured to download a portion of a service application associated with a connectivity based service to the service gateway unit associated with a user upon receipt of confirmation that the user has subscribed to the connectivity base service associated with the service application, and wherein said service gateway unit runs said portion of the service application to interact with said at least one remote device, thereby allowing said at least one remote device to be monitored by the associated connectivity based service.

2. The system of claim 1, wherein said communication link is the Internet.

3. The system of claim 1, wherein said at least one remote device includes a sensor.

4. The system of claim 3, wherein said at least one remote device is a thermostat and said portion of the service application runs to operate said thermostat and control temperature.

5. The system of claim 1, wherein control and maintenance of said service gateway unit is performed by said network operator equipment.

6. The system of claim 5, wherein said service provider equipment loads software associated with a connectivity based service onto said network operator equipment, said software including control and maintenance instructions for supervising said service gateway unit's implementation of the connectivity based service.

7. The system of claim 1, wherein said at least one remote device includes a transducer.

8. The system of claim 1, wherein said at least one remote device includes a processor.

9. The system of claim 1, wherein said at least one remote device includes an electricity meter and said connectivity based service is automated meter reading.

10. The system of claim 1, wherein said at least one remote device includes an electricity meter and said connectivity based service is real time electricity pricing.

11. The system of claim 1, wherein said at least one remote device includes an electricity meter and said connectivity based service is automated electricity load control.

12. The system of claim 1, wherein said client device is directly connected to said local area network.

13. The system of claim 1, wherein said client device is connected to the system via a radio communication system.

14. The system of claim 1, further comprising:

a smart card device for interacting with a smart card, wherein the smart card contains said portion of the service application associated with the connectivity based service to be downloaded by the network operator equipment upon confirmation.

15. The system of claim 1, wherein said client device comprises a display device, wherein output of information associated with a connectivity based service is adjusted based on a size of said display.

16. A method for distributing and controlling a connectivity based service, the method comprising the steps of:

receiving a request for a connectivity based service;

receiving, from a service provider, confirmation that a user has subscribed to a connectivity, based service provided by said service provider;

activating a service application associated with the connectivity based service subscribed to by:

transmitting command signal from the network operator equipment to a service gateway unit associated with the subscriber, to execute a portion of the service application if said portion of the service application has been preloaded on said service gateway unit;

otherwise downloading a portion of said service application to the subscriber's service gateway unit, wherein said portion or the service application allows the subscriber's service gateway unit to interact with at least one remote device to be monitored by the connectivity based service.

17. The method of claim 16, wherein the service gateway unit is connected to the at least one remote device via a local area network.

18. The method of claim 16, further comprising the steps of:

receiving a request for a second connectivity based service;

activating a second service application associated with the second connectivity based service subscribed to by the user.

19. The method of claim 18, wherein said first connectivity based service is automated meter reading and said at least one remote device is an electricity meter.

20. The method of claim 18, wherein said second connectivity based service is automated load control and said at least one remote device is an electricity meter.

21. The method of claim 16, wherein said service application is a distributed software, that is distributed across processors in addition to said service gateway unit.

* * * * *